Figure 1:
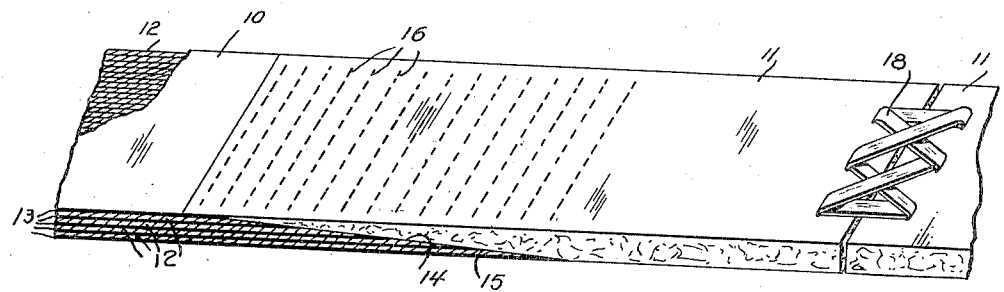

A. A. SOMERVILLE.
BELT.
APPLICATION FILED OCT. 5, 1917.

1,322,067.

Patented Nov. 18, 1919.

Attest:
S. G. Taylor.

Inventor:
Albert A. Somerville,
by Ernest Hopkinson
his Atty.

UNITED STATES PATENT OFFICE.

ALBERT A. SOMERVILLE, OF FLUSHING, NEW YORK, ASSIGNOR TO NEW YORK BELTING & PACKING COMPANY, A CORPORATION OF NEW YORK.

BELT.

1,322,067.  Specification of Letters Patent.  Patented Nov. 18, 1919.

Application filed October 5, 1917. Serial No. 194,831.

*To all whom it may concern:*

Be it known that I, ALBERT A. SOMERVILLE, a citizen of the United States, and a resident of Flushing, Long Island, county of Queens, and State of New York, have invented certain new and useful Improvements in Belts, of which the following is a full, clear, and exact description.

This invention relates to power transmission belts.

It has long been known that leather possesses peculiar qualities of its own for use where great strength, durability, and flexibility are required. These qualities render it particularly desirable for use as belt bands, which as an incident of service, are required to withstand severe strains and wear. Belts made entirely of leather are extremely costly and are open to the further objection that they frequently become inoperative due to excessive stretching and must then be shortened or have their tension in some other way increased. Fabric of various kinds is also extensively used in the manufacture of transmission belts and possesses the marked advantage of being less expensive than leather. Both types of belts however, require to be shortened from time to time to take up the permanent stretch that occurs in service. For this reason the ends of the belt are temporarily fastened together and while no trouble is experienced in so fastening the ends of leather belts, it has been found exceedingly difficult to secure the ends of fabric belts by any simple means that will permit the necessary shortening and at the same time provide a joint sufficiently strong to withstand the strain incident to service.

The principal object of the present invention accordingly is to provide a belt having its major portion made of fabric and ends made of leather adapted to be shortened from time to time to take up the stretch occurring in the belt and to provide a durable and convenient means for forming the belt into a continuous band.

Other objects of my invention will hereinafter appear.

In the drawings:—

Figure 2:
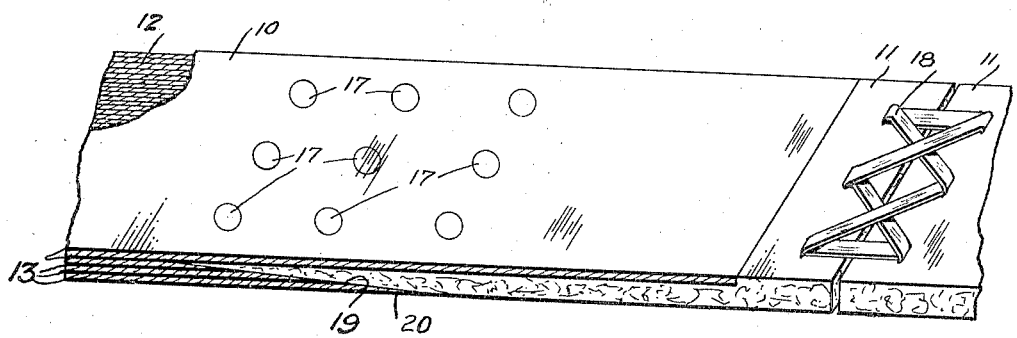

Figure 1 is a perspective view with portions broken away showing one embodiment of my invention, Fig. 2 is a perspective view with portions broken away showing another embodiment of my invention.

Referring to the drawings, 10 indicates a belt band made of rubberized cord fabric to the ends of which are secured tips 11 made of leather.

I may use square woven fabric cut on the straight if desired but on account of the crimp attendant the weaving of this fabric, it has more stretch than cord fabric, which latter is made entirely of the woof thread cords with weaker binder threads woven at intervals to temporarily hold the woof threads in place. My invention however, is not limited to any style of fabric and in fact the binder threads may be dispensed with entirely, the cords being held together merely by the vulcanized rubber component. Where the straight woven fabric is used in plied-up fashion, the plies may be treated with oil in place of rubber and they may be sewed together in any of the usual ways in making fabric belts. It is desirable however especially where woven fabric is used to provide a sufficient length of leather to allow its being cut off to take care of the stretch in the belt.

In the construction illustrated in Fig. 1 the band 10 is formed of a plurality of plies 12 of cord fabric coated with rubber 13. For the purpose of attaching the leather tips, each end of the band is provided with a beveled or tapered portion 14 shaped to fit with a correspondingly tapered portion 15 of the tip, to form a smooth flexible lap-joint. The overlapping portions of the joint are firmly united together by glue, cement, or other adhesive, but it is to be understood that stitching 16 or rivets 17 (Fig. 2) or other suitable attaching means may be used if desired. The tips may be connected together to form an endless belt by lacing 18 or other suitable fastening means.

In Fig. 2 is shown a modified form of construction wherein the leather tips 11 are saddle jointed to the band 10 of rubberized cord fabric. These joints are formed by providing V-shaped clefts 19 at each end of the band into which the tapered portion 20 of the tips is snugly fitted. If desired other suitable means of attaching the tips may be employed. It is however usually desirable that the leather ends be secured to the fabric by a flush joint that is to say, the leather and fabric should preferably lie in the same plane.

Although I have described one form of belting material of which the band may be made it is evident that various other kinds of non-leather belting may be used in place thereof.

By my improved construction I have provided a belt possessing the united advantages of leather and non-leather material which can be manufactured at a relatively low cost.

While I have described some of the embodiments of my invention it is to be understood that various changes in form, material or arrangement may be made without departing from the spirit and scope of the invention as defined in the appended claims.

Having thus described my invention, what I claim and desire to protect by Letters Patent is:—

1. A power transmission belt, comprising a rubberized fabric middle portion and ends made of leather.

2. A power transmission belt, comprising a fabric middle portion and ends made of leather.

3. A power transmission belt, comprising a rubberized cord fabric middle portion and ends made of leather.

4. A power transmission belt, comprising a cord fabric middle portion and ends made of leather.

5. A power transmission belt made of fabric and having end portions of leather equal in their combined length to at least the permanent stretch that the fabric is capable of taking.

6. A power transmission belt made of fabric and having end portions of leather extending beyond the fabric a sufficient distance to permit shortening said ends to take up the permanent stretch that the belt is capable of taking.

7. A power transmission belt made of fabric and having ends of leather, said ends being substantially the same width as the belt.

8. A power transmission belt having a fabric portion and end portions made of leather, said end portions being secured to said fabric portion transversely of the belt.

Signed at New York city, N. Y., this 3rd day of October, 1917.

ALBERT A. SOMERVILLE.